March 1, 1966  P. W. D. FREITAG, JR., ET AL  3,237,754
CONVEYOR
Filed April 18, 1960  2 Sheets-Sheet 1
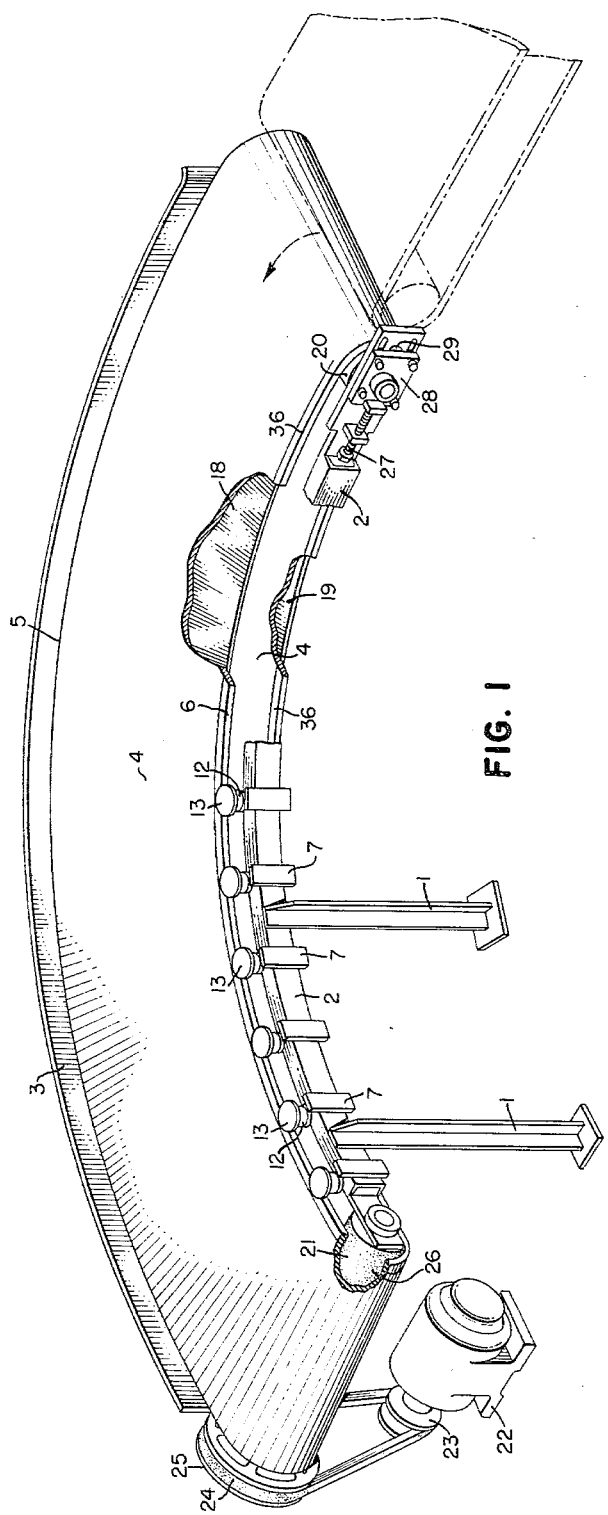
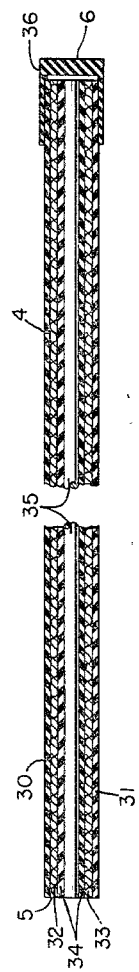
INVENTOR.
PAUL W. D. FREITAG, JR.
LOUIS SEELBACH KRAFT, JR.
BY
J.B. Holden
ATTORNEY

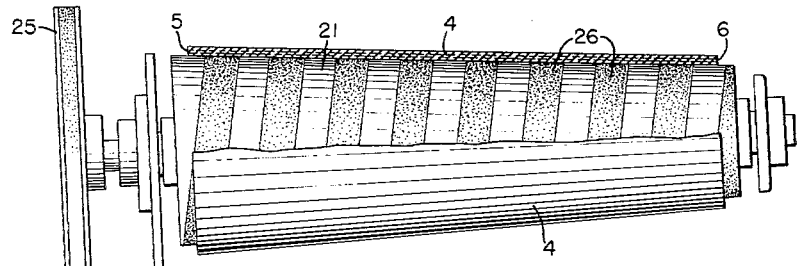
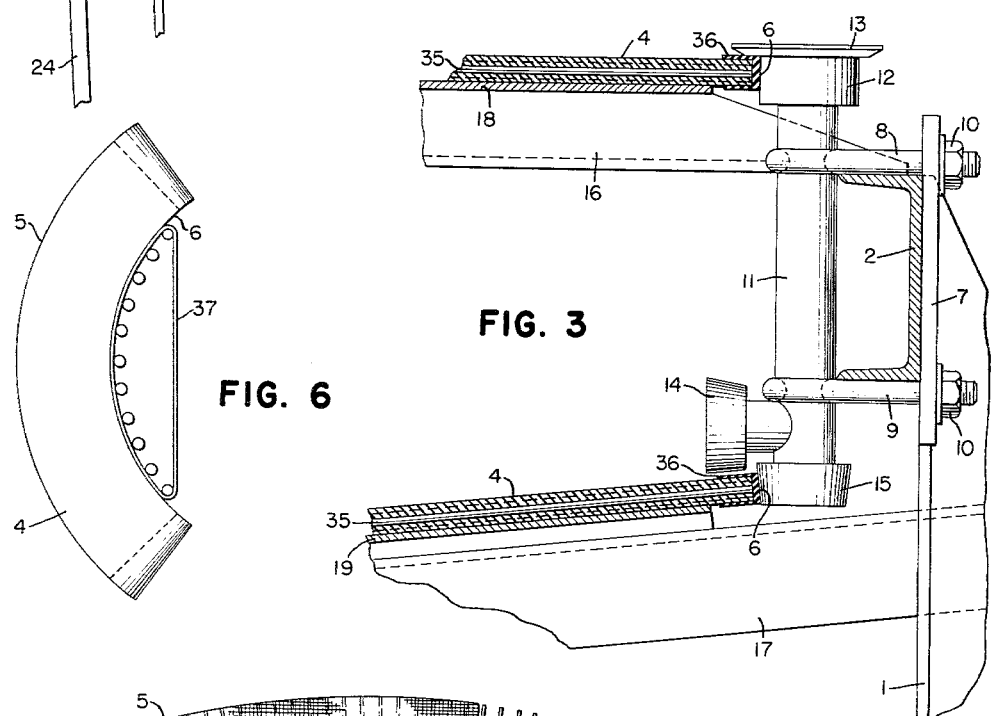
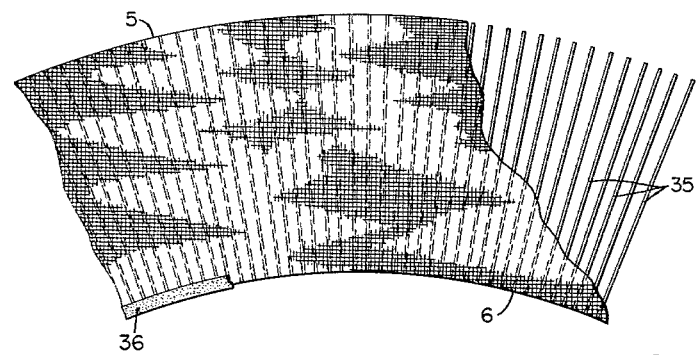

3,237,754
CONVEYOR
Paul W. D. Freitag, Jr., Akron, and Louis Seelbach Kraft, Jr., Cuyahoga Falls, Ohio, assignors to The Goodyear Tire & Rubber Company, Akron, Ohio, a corporation of Ohio
Filed Apr. 18, 1960, Ser. No. 22,833
2 Claims. (Cl. 198—182)

This invention relates to belt conveyors in general and in particular to a laterally curved conveyor.

In many package handling applications it is desirable or necessary to convey articles for a distance on a straight line and then alter the direction of motion usually by an angle of between 0 and 90 but in some cases as much as 180 degrees. Early conveyors were restricted due to their construction limitations to conveying only in straight lines. Therefore, when the direction of motion was to be changed it was usually necessary to overlap two straight conveyors at the desired angle and to change direction of conveyance of an article by dropping it from one conveyor to the other or to abut the conveyors and utilizing what is referred to as a gate arm. Such a method, however, is unsatisfactory in the handling of fragile articles such as food stuffs, postal items, or personal baggage and effects such as are transported to and from commercial aircraft. For this reason the straight flight overlapped conveyors were supplanted by laterally or horizontally curved conveyors which are curved to the same radius throughout their paths and in which a flat wide belt is forced to travel in the curved path by means of transverse tension devices usually arranged along the radially outer edge of the belt. Usually such devices comprised hooks or cleats attached to the belt and arranged to engage a track, chain, or raceway mounted on the outer edge of the conveyor supporting mechanism. Such arrangements, however, resulted not only in a relatively heavy and expensive belt but also noisy operation which is undesirable in many public installations. Furthermore, the mechanism used to maintain the belt in its curved path often utilized metal to metal contact and relative motion between metal which resulted in rapid wear and high frictional coefficients. It can be readily understood that increased power demands of the system due to high friction and relatively short belt life when compared to initial cost are major disadvantages. In addition, many such systems require complex belt drive systems and belt installation procedures.

It is an object of the present invention to provide a laterally curved conveyor having a simple and relatively inexpensive belt structure.

It is a further object of the present invention to provide a laterally curved conveyor which is relatively quiet.

It is a still further object of the present invention to provide a laterally curved conveyor in which the belt is relatively easily installed and the complexity of the drive mechanism is substantially reduced.

These and other objects of the present invention will become apparent from the following description and drawings in which:

FIG. 1 is a view of an assembled laterally curved conveyor according to the present invention;

FIG. 2 is a partial view of one end of the conveyor showing the driving arrangement;

FIG. 3 is a detail of the belt guide mechanism;

FIG. 4 is a cross section of one form of belt used in the conveyor;

FIG. 5 is a plan view of a belt similar to that shown in FIG. 4; and

FIG. 6 illustrates a modification of the belt guide mechanism.

Referring to FIG. 1, the conveyor comprises a support assembly having vertical legs 1 along the radially inner and outer edges of the curve through which the belt travels attached to side plates 2 and 3 to which are attached the belt guide and support elements. The side plate 3 extends some distance above the surface of belt 4 to prevent articles placed on the outer portion of the belt from falling from the outer belt edge 5. The plate 2 is located somewhat inwardly of the inner radial edge 6 of the belt and has mounted thereon at spaced intervals belt guide assemblies 7. Although only a portion of the guide assemblies are shown, it is understood of course that they extend along the entire inner edge 6 of the belt and may be spaced at greater or lesser intervals as dictated by the flex limitations of the belt.

A typical guide assembly 7 is shown in detail in FIG. 3 and comprises horizontal webs 8 and 9 attached to side plate 2 by means such as the bolts 10. A vertically disposed pin 11 is mounted to webs 8 and 9 in a conventional manner and has attached to the upper and lower ends bearing assemblies which position and guide the belt 4. The belt is positioned and guided along its inner radial edge 6 by a flanged wheel 12 rotatably mounted on pin 11 and having its flange 13 extending out over the upper surface of belt 4 to prevent it from riding up the lateral surface of the bearing wheel 12. The belt is guided and positioned in its return flight by means of rotatably mounted bearing wheels 14 and 15 disposed at the lower end of pin 11, wheel 15 providing a surface against which the inner edge of the belt may bear and the wheel 14 extending out over the upper surface of the belt to prevent it from riding up off wheel 15. It is understood of course that the dual bearing wheels 14 and 15 may be replaced or interchanged with wheel 13 if desired. Bearing wheels 14 and 15 may be cylindrical but are preferably tapered for reasons which will be later apparent. A second pair of webs 16 and 17 extend substantially horizontally at spaced intervals from plate 2 and support flat plates 18 and 19 which provide smooth load supporting running beds for the belt. If desired, plates 18 and 19 may be replaced by tapered idler rolls. Web 17 and plate 19 are disposed at a slight angle with respect to horizontal since, in order that the package conveying upper surface of the belt be disposed horizontally, it is necessary, due to the curved nature of the conveyor, that the return flight or under portion of the conveyor extend downwardly towards the radially outer edge. For the same reason the rolls 20 and 21 which are rotatably mounted in plates 2 and 3 at the terminals of the curve are necessarily tapered with the larger diameter at the outer edge of the belt and have end diameters which are in the same ratio as the inner and outer radii of the belt. One of the rolls, for example 20, merely idles to maintain the belt in position and under the desired longitudinal tension while the other, such as 21, is coupled to the drive motor 22 through a pulley 23 attached to motor 22, a transmission belt 24 and pulley 25 attached to one end of roll 21. The arrangement of the drive in relation to roll 21 is shown in some detail in FIG. 2. It should be noted that roll 21 may be smooth surfaced and drives belt 4 through frictional contact only, it being found that with the type of belt of the present invention more than the required loads can be transported at relatively high speeds without the need of sprocket and change drives such as are found in the prior art and at the same time insure low belt wear. However, as illustrated in FIG. 2, the drive roll may be provided with a surface having a higher coefficient of friction by means of a grit paper or fabric 26, but preferably rubber adhered to the surface of the roll 21. The use of such a surface materially reduces the tension required to provide adequate belt drive and therefore adds to the belt life.

The conveyor is provided at each roll with conventional devices such as threaded bolt 27, brackets 28, and slot 29 to permit adjustment of the rolls to vary the longitudinal tension on the belt.

FIGS. 4 and 5 illustrate the construction of a belt useful on the conveyor of the present invention. The belt shown comprises outer elastomeric layers 30 and 31 superimposed on inner fabric layers 32 and 33. Between the fabric layers 32 and 33 is an inner elastomeric stratum 34 in which are embedded a plurality of relatively rigid rods 35, which are preferably made of a metal such as aluminum or steel. The rods, which may be more clearly seen in FIG. 5, are disposed at spaced intervals along the belt and in a generally radial manner, the radius referred to being that generating the arc through which the belt travels. The number and size of the stiffening members such as rods 35 may be varied over a substantial range depending on the arc through which the belt is run since the function of the members 35 is to provide the belt with sufficient transverse rigidity to eliminate buckling of the belt and therefore a tendency to climb up over the belt guide pulleys. It will be appreciated, of course, that by increasing the number and relative position of the fabric plies in the belt a sufficient stiffness may be obtained for many applications without the use of rods 35. However, the use of the rods permits the utilization of a belt of minimum thickness which more easily passes around the pulleys.

To minimize the running friction between the belt and the metal surfaces of the conveyor mechanism and to reduce the possibility that the ends of rods will, in time, contact the metal surfaces of the guide pulleys, the belt is provided with an edge piece or cover 36. While a variety of materials may be used for such purpose, it has been found that a polyurethane elastomer is very satisfactory. The edge strip 36 also performs the important function of distributing the load between the wires 35. As an alternative, the rods 35 may be shortened somewhat at the inner radial edge of the belt so that the ends are recessed and, hence, will not contact the guide pulleys. In many applications, the elastomeric outer layers 30 and 31 of the belt may be eliminated and a so-called bare-back belt such as shown in FIG. 5 utilized very advantageously since a bare-back or uncoated fabric surface has a somewhat lower coefficient of friction. Of course, the articles to be conveyed many times dictate the surface requirements of the belt, particularly where the curve conveyor is also running at a vertical angle as is obviously possible where the articles are to be conveyed to a different level and also around a curve.

FIG. 6 illustrates a modification of the belt in which the edge strip 36 is eliminated but a low coefficient of friction at the belt edge is assured by the use of an endless strip 37 of plastic, fabric, or a metal such as stainless steel placed in a loop around the guide pulleys.

It will be appreciated that the endless belt utilized on the conveyor of the present invention may be manufactured by a variety of conventional building and vulcanization techniques and that it may comprise a number of short arcuate segments connected together through conventional fasteners which need not be described here.

Before mounted on the conveyor the belt in the fully assembled condition may assume a variety of configurations. For example a belt for use as a conveyor having an arc of less than 180 degrees will, under equiperimetrical radial force, describe a frustum of a right circular cone and the stiffening members will be disposed as elements of the cone and substantially parallel to the generatrix thereof. In the case of a belt for a 180 degree conveyor, the belt dismounted from the conveyor assumes the shape of a flat torus and the stiffening means are generally radial thereof. In belts for conveyors traveling through arcs in excess of 180 degrees, the shape of the unmounted belt becomes somewhat more complex. However, in all cases, when the belts are folded along a transverse axis and mounted on the guide mechanism, they describe a smooth curve which is an arcuate portion of a circle and, where the plural rods are utilized to provide lateral rigidity or stiffness to the belt, they are disposed generally radially of the arc.

It is apparent that the belt made according to the present invention is relatively easily mounted and dismounted in comparison to prior art belts which utilize bulky and complex tensioning to hold or maintain the belt in a curved path.

While certain representative embodiments and details have been shown for the purpose of illustrating the invention, it will be apparent to those skilled in this art that various changes and modifications may be made therein without departing from the spirit or scope of the invention.

We claim:

1. A mechanism for guiding and controlling the motion of a laterally curved conveyor belt comprising, in combination, a frusto-conical rotatable roller disposed at either terminus of the path of the conveyor with the smaller diameter at the radial inward edge thereof and the upper edge of the roller disposed substantially horizontally and along the radius of the conveyor path, means to drive at least one of said rollers, means arranged between said rollers and defining a pair of substantially flat superimposed running surfaces substantially coplanar with the upper and lower edges of said rollers and following the curved path of the conveyor, and a plurality of spaced apart idler guide rolls and means associated therewith extending over the upper surface of the inner edge of a curved belt disposed on said mechanism to prevent said belt from moving upwardly over said idler rolls, an endless strip disposed about said guide rolls and adapted to contact the inner edge of said belt to provide a continuous running surface for the radially inner edge of said belt, thereby providing the sole lateral restraint thereon to maintain said belt in the desired curved path.

2. A laterally curved conveyor belt assembly comprising, in combination, a frusto-conical rotatable roller disposed at either terminus of the path of the conveyor with the smaller diameter at the radial inward edge thereof and the upper edge of the roller disposed substantially horizontally and along the radius of the conveyor path, means to drive at least one of said rollers, means arranged between said rollers and defining a pair of substantially flat superimposed running surfaces substantially coplanar with the upper and lower edges of said rollers and following the curved path of the conveyor, an endless curved belt structure encompassing said rollers and extending along said running surfaces therebetween; said belt comprising an endless web structure having a central elastomeric portion and at least one layer of fabric superimposed on each side thereof and firmly adhered thereto, and means extending across substantially the entire width of said structure to provide substantial lateral rigidity to said structure, said belt when folded along a transverse axis forming an arcuate portion of a circle; and a plurality of spaced apart idler guide rolls and means associated therewith extending over the upper surface of the inner edge of said endless curved belt disposed on said mechanism to prevent said belt from moving upwardly over said idler rolls, an endless strip disposed about said guide rolls and adapted to contact the inner edge of said belt to provide a continuous running surface for the radially inner edge of said belt, thereby providing the sole lateral restraint thereon to maintain said belt in the desired curved path.

References Cited by the Examiner

UNITED STATES PATENTS

| | | | |
|---|---|---|---|
| 24,226 | 5/1859 | McPherson | 198—195 |
| 883,185 | 3/1908 | Felsing. | |

(Other references on following page)

UNITED STATES PATENTS

| | | | |
|---|---|---|---|
| 1,254,941 | 1/1918 | Snow | 198—182 |
| 1,491,412 | 4/1924 | Mowrey. | |
| 1,698,786 | 1/1929 | Finn | 198—182 X |
| 2,234,537 | 3/1941 | Blackburn | 198—182 |
| 2,256,168 | 9/1941 | Paterson | 198—182 |
| 2,267,970 | 12/1941 | Boal | 198—136 |
| 2,446,890 | 8/1948 | Stadelman | 198—182 |
| 2,686,589 | 8/1954 | Temple | 198—182 |
| 2,732,930 | 1/1956 | Thomson | 198—201 |

FOREIGN PATENTS

| | | |
|---|---|---|
| 227,256 | 5/1959 | Australia. |
| 1,026,551 | 2/1953 | France. |
| 1,092,094 | 11/1954 | France. |
| 520,826 | 3/1931 | Germany. |

SAMUEL F. COLEMAN, *Primary Examiner.*

HUGO O. SCHULZ, JULIUS E. WEST, ABRAHAM BERLIN, ERNEST A. FALLER, *Examiners.*